United States Patent
Janik et al.

[11] Patent Number: 5,794,598
[45] Date of Patent: Aug. 18, 1998

[54] FUEL CIRCUIT AND CIRCULATION METHOD FOR FUEL INJECTION SYSTEM

[75] Inventors: Leon P. Janik, Suffield; Michael J. Williams, Glastonbury, both of Conn.

[73] Assignee: Stanadyne Automotive Corp., Windsor, Conn.

[21] Appl. No.: 869,377

[22] Filed: Jun. 5, 1997

Related U.S. Application Data

[63] Continuation of Ser. No. 667,644, Jun. 21, 1996.
[51] Int. Cl.$^6$ .................................................. F02M 37/04
[52] U.S. Cl. .............................................. 123/514; 123/541
[58] Field of Search ............................. 123/510, 511, 123/514, 540-1

[56] References Cited

U.S. PATENT DOCUMENTS

| | | | |
|---|---|---|---|
| 4,411,239 | 10/1983 | Kelch | 123/514 |
| 4,454,851 | 6/1984 | Bourbonnaund et al. | 123/514 |
| 4,481,931 | 11/1984 | Bruner | 123/514 |
| 4,543,938 | 10/1985 | Szlaga | 123/514 |
| 4,570,604 | 2/1986 | Thornton et al. | 123/514 |
| 4,617,116 | 10/1986 | Seiler | 123/514 |
| 4,625,701 | 12/1986 | Bartlett et al. | 123/514 |
| 4,809,665 | 3/1989 | Mosig et al. | 123/514 |
| 5,195,494 | 3/1993 | Tuckey | 123/514 |
| 5,533,478 | 7/1996 | Robinson | 123/510 |

Primary Examiner—Thomas N. Moulis
Attorney, Agent, or Firm—Alix, Yale & Ristas, LLP

[57] ABSTRACT

A fuel circuit for a fuel system including a fuel reservoir, a fuel injection system, a fuel lift pump, and a fuel filter assembly. The fuel circuit includes a fuel passageway for recirculating the excess fuel flow from the outlet of the fuel injection pump to the inlet of the fuel injection pump. The excess fuel flow, which is pressurized by the fuel injection pump, is preferentially utilized as the fuel source over fuel in the fuel reservoir, which is at a lower pressure. The fuel circuit may include a single fuel-to-air heat exchanger or a fuel-to-coolant heat exchanger and a coolant-to-air heat exchanger to remove heat from the excess fuel flow, depending on the amount of heat generated by the fuel injection system and the fuel lift pump and the expected ambient temperature conditions. Circulation pumps in the fuel passageway and the coolant line may be used to facilitate removal of heat in the two heat exchanger system.

18 Claims, 6 Drawing Sheets

FUEL CIRCUIT AND CIRCULATION METHOD FOR FUEL INJECTION SYSTEM

This is a continuation of copending application Ser. No. 08/667,644 filed on Jun. 21, 1996.

BACKGROUND OF THE INVENTION

This invention relates generally to fuel supply systems which are employed in connection with internal combustion engines. More particularly, the present invention relates to fuel circuits for fuel supply systems which involve fuel injection.

Generally, the fuel injection system contains a pump that delivers a higher flow of fuel than is consumed by the engine at the maximum engine power demand. Conventionally, the excess fuel flow is delivered back to the fuel reservoir. Such systems therefore mix the recycled fuel, which has had particulate matter and water removed by passage through the fuel filter, with the fuel stored in the fuel reservoir. Consequently, the recycled fuel becomes contaminated by the foreign matter that is present in the fuel system and fuel reservoir. The recycled fuel may be exposed to additional moisture due to condensation of water in the air space above the stored fuel. In addition, the constant addition of the recycled fuel may cause sediment in the bottom of the fuel reservoir to become suspended in the fuel, thereby adding foreign matter to the fuel flow.

Fuel injection pumps are high pressure pumps that generally generate a large amount of heat. Much of this heat is absorbed by the fuel flowing through the pump. The excess fuel returning to the fuel reservoir carries a portion of this heat. This heat may cause vapor lock and degrade fuel system performance when the engine is operated in an environment having an elevated temperature.

SUMMARY OF THE INVENTION

Briefly stated, the invention in a preferred form is a fuel circuit for a fuel system including a fuel reservoir for storing a quantity of fuel, a fuel injection system for supplying pressurized fuel to the engine, a fuel filter assembly for removing water and particulate matter from the fuel, and a fuel lift pump for providing a flow of fuel from the fuel reservoir to the fuel injection system. The fuel injection system may employ a fuel injection pump, a rail-type configuration or other fuel injection techniques.

The fuel circuit in accordance with the subject invention includes a fuel passageway for recirculating the excess fuel flow produced by the fuel injection system under normal operating conditions. The passageway extends from the return outlet of the fuel injection system to the supply passageway of the fuel injection system. The excess fuel flow, which is pressurized by the fuel injection system, is preferentially utilized as the fuel source over fuel in the fuel reservoir, which is at a lower pressure. Since contaminants such as water and particulate matter have already been removed from the recirculated excess fuel flow, the filtering load experienced by the fuel filter can be greatly reduced.

The operation of the fuel injection system and fuel lift pump generates heat that is absorbed by the fuel. The fuel circuit may employ a single fuel-to-air heat exchanger or a fuel-to-coolant heat exchanger and a coolant-to-air heat exchanger to remove heat from the excess fuel flow, depending on the amount of heat generated by the pumps and the expected ambient temperature conditions. The fuel circuit may interface with an air conditioning system by exchanging heat between the fuel and freon. Circulation pumps in the fuel passageway and the coolant line may be used to facilitate removal of heat in the dual heat exchanger embodiment.

An object of the invention is to provide a new and improved apparatus and method for recirculating a portion of the excess fuel flow from the fuel injection pump.

Another object of the invention is to provide a new and improved fuel circuit that reduces the loading rate of the fuel filter and reduces the pump capacity for supplying fuel to the injection system.

A further object of the invention is to provide an efficient fuel circulation system for producing an enhanced temperature differential between fuel and a cooling media.

A yet further object of the invention is to provide an efficient apparatus and method for removing heat from the fuel flowing through a fuel circuit for a fuel injection system.

Other objects and advantages of the invention will become apparent from the specification and the drawings.

DETAILED DESCRIPTION OF THE PREFERRED EMBODIMENTS

Figure 1:
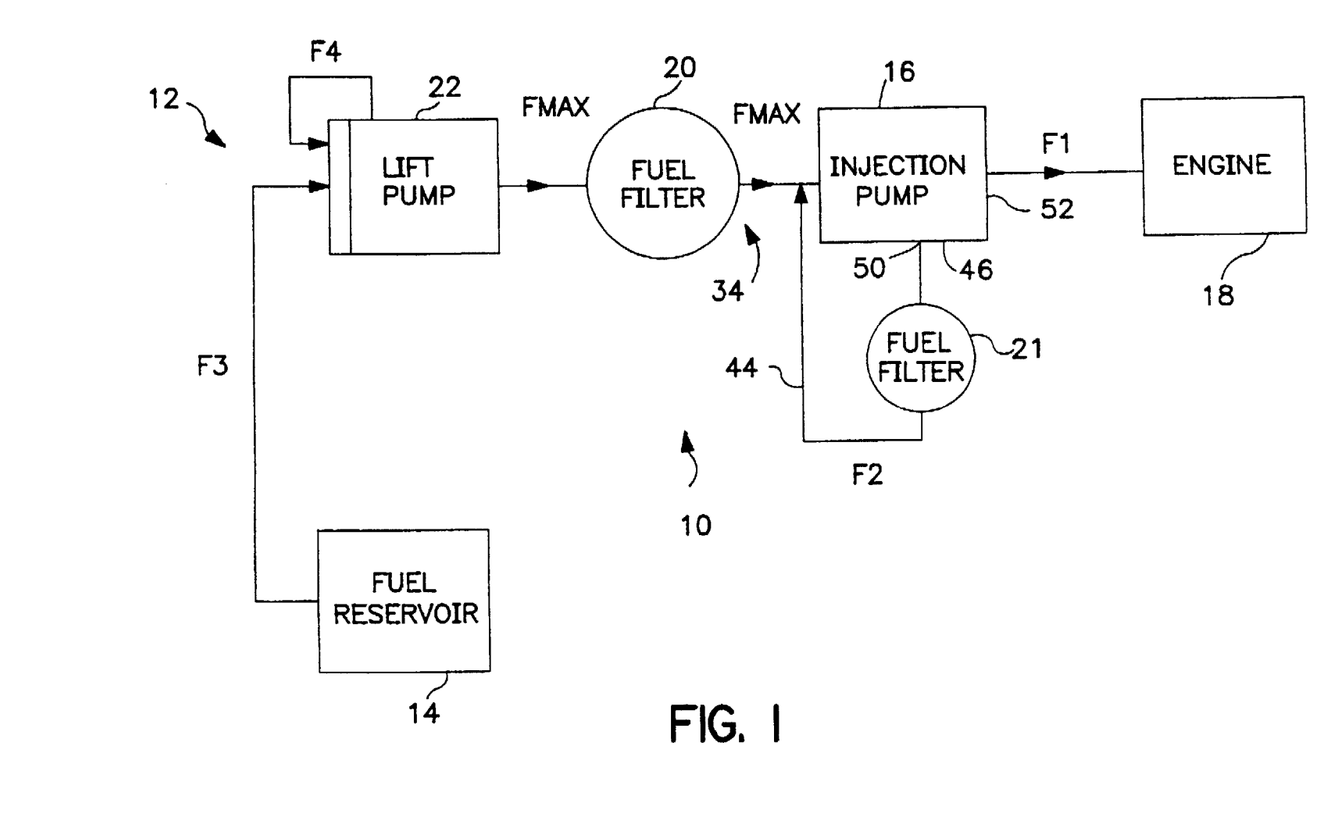
FIG. 1 is a schematic view of a fuel supply system for an internal combustion engine which employs a fuel circuit in accordance with the present invention.

With reference to the drawings wherein like numerals represent like parts throughout the several figures, a representative fuel system which incorporates a fuel circuit 10 in accordance with the present invention is generally designated by the numeral 12. Fuel system 12 comprises a fuel reservoir 14 for storing a quantity of fuel, a fuel injection pump 16 for supplying pressurized fuel to the engine 18, a fuel filter assembly 20 for removing water and particulate matter from the fuel, and a fuel lift pump unit 22 for providing sufficient pressure to produce a flow of fuel from the fuel reservoir 14 to the fuel injection pump 16. The fuel circuits described herein are illustrated in conjunction with a fuel injection pump. However, the invention has applicability in connection with numerous types of fuel injection systems, including rail-type systems and accumulator systems.

Figure 2:
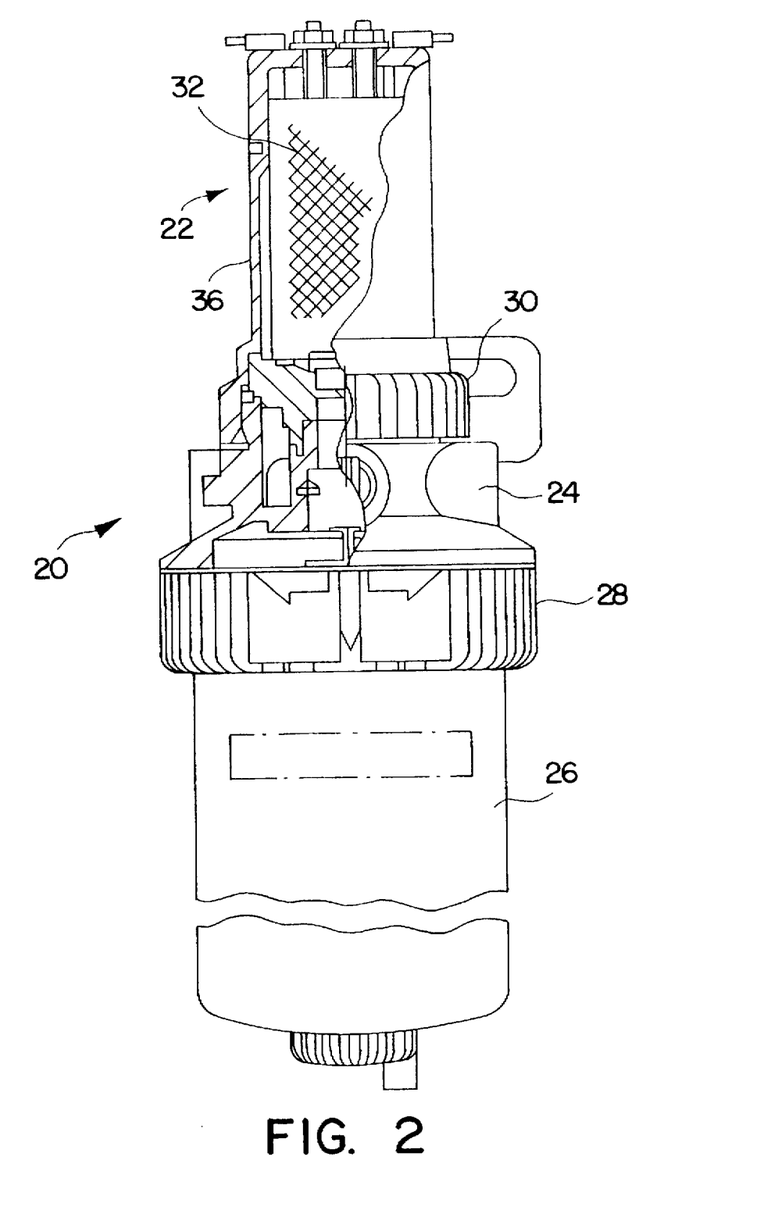
FIG. 2 is a frontal view, partly broken away and partly in section with portions removed, illustrating a modular fuel filter assembly incorporating a fuel lift pump for the fuel circuit of FIG. 1.
Figure 3:
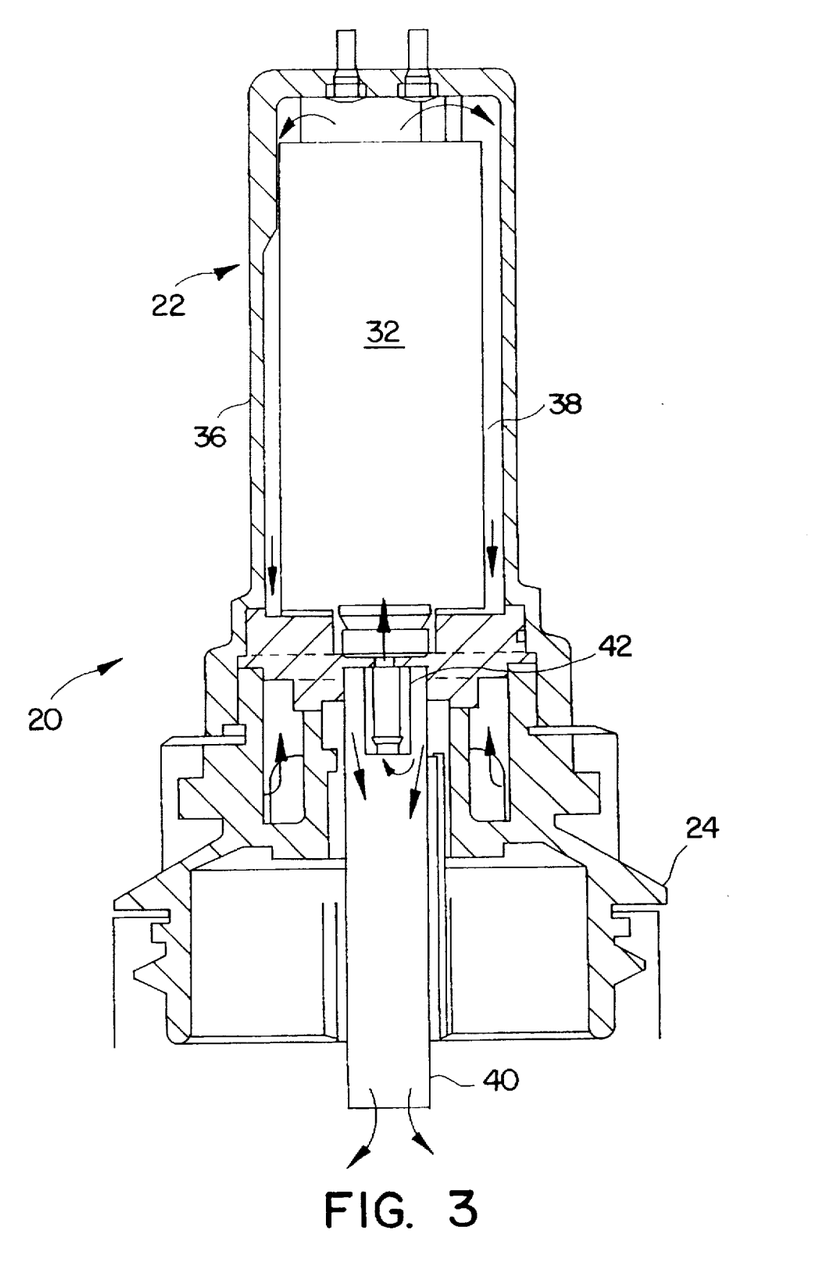
FIG. 3 is an enlarged fragmentary sectional view, partly in schematic, of the fuel filter assembly base and fuel lift pump of FIG. 1.

With reference to FIGS. 2 and 3, the fuel filter assembly 20 comprises a base 24 and a disposable filter cartridge 26 which is secured to the base 24 by means of a retaining ring 28 or collar. In one embodiment, the fuel lift pump unit 22 is mounted to the base 24 opposite the cartridge 26 and secured by means of a lock ring 30. Such a fuel filter assembly is described in copending U.S. patent application Ser. No. 08/634,812 filed on Apr. 19, 1996, which application is assigned to the assignee of the present invention and the disclosure of which is incorporated herein by reference. Alternatively, the fuel system 12 may comprise a fuel lift pump that is separate from the fuel filter assembly.

The filter cartridge 26 houses a filter (not shown) which has a defined useful life. The cartridge 26 is periodically replaced with a compatible replacement cartridge when the filtering qualities have been sufficiently degraded. The illustrated filter assembly 20 is an inverted-type filter assembly wherein the cartridge 26 is suspended generally below the base 24 or header. The cartridge 26 may contain a dual stage or other type filtering system which generally functions to remove particulate matter from the fuel line and optionally to separate water from the fuel. In some embodiments, the orientation of the cartridge 26 and the fuel lift pump unit 22 may be inverted or positioned in various other angular orientations defined by the dimensional constraints of the engine compartment.

The fuel lift pump unit 22 comprises an electric pump 32 (FIGS. 2 and 3) which functions to supply a steady supply of fuel to the fuel injection pump 16 from the fuel reservoir 14, via the fuel filter assembly 20, at the low pressure side 34 of the fuel injection pump 16. The fuel lift pump 32 is electrically powered by a voltage source (not shown) which may be of conventional form. In some embodiments the fuel lift pump 32 is activated by the ignition fuel lift switch of the engine or a specific switch on the vehicle cab console. The fuel lift pump 32 may operate concurrently with the operation of the associated engine 18.

The fuel lift pump 32 is an in-line roller vane-type or gerotor pump which is generally centrally disposed in the housing 36. The fuel lift pump 32 is a positive displacement pump which typically pressurizes the fuel to 10 or more psi and has a capacity of 40 to 70 gallons per hour. The flow path through the fuel lift pump unit 22 is illustrated by the arrows in FIG. 3. After the fuel enters the filter assembly 20 through the inlet (not shown), the fuel flows to the fuel lift pump 32 where it is pressurized. The pressurized fuel from the pump 32 is conducted via a passage 38 to an inwardly defined annulus (not shown) for communication with a conduit 40 which functions as the inlet passageway to the filter cartridge 26. The fuel flows through the filter element, an outlet passage, and the outlet (not shown) to the fuel injection pump 16. A spring loaded bypass valve 42 diverts the fuel away from the fuel lift pump 32 if the pressure exceeds a threshold defined by the spring force, such as, for example, 8 psi.

The flow of fuel F1 required by the engine 18 is proportional to the power demand on the engine 18. Generally, both the fuel lift pump 32 and the fuel injection pump 16 are constant capacity pumps that are sized to provide a flow of fuel Fmax that exceeds the engine fuel consumption at the maximum power demand. Consequently, the fuel lift pump 32 and the fuel injection pump 16 provide excess fuel flow F2 (where F2=Fmax−F1). Conventionally, such excess fuel flow F2 is delivered back to the fuel reservoir 14. A fuel circuit 10 in accordance with the subject invention includes a fuel passageway 44 for recirculating the excess fuel flow F2 from the outlet 46 of the fuel injection pump 16 to the inlet of the fuel filter. Since the fuel reservoir 14 is at atmospheric pressure and the excess fuel flow F2 is pressurized by the fuel injection pump 16, the excess fuel flow F2 is preferentially utilized as the source of fuel. Consequently, the flow of fuel F3 from the fuel reservoir 14 is equal to difference between the constant capacity flow rate Fmax of the fuel lift pump 32 and fuel injection pump 16 and the excess fuel flow F2 (F3=Fmax−F2). Since contaminants such as water and particulate matter have already been removed from the recirculated excess fuel flow F2, the filtering load experienced by the fuel filter 20 is therefore greatly reduced.

The bypass valve 42 acts to regulate the flow of fuel to the fuel filter 20, the fuel injection pump 16 and the engine 18. Since the flow F3 from the fuel reservoir 14 represents the difference between the constant capacity flow rate Fmax of the fuel lift pump 22 and fuel injection pump 16 and the excess fuel flow F2, as the excess fuel flow F2 decreases, the flow F3 required from the fuel reservoir 14 increases. The increased excess fuel flow F2 reduces the demand for fuel flow F3 from the fuel reservoir 14. Any initial pressure surge due to the increased excess fuel flow F2 causes the bypass valve 42 in the fuel lift pump unit 22 to divert a portion F4 of the excess fuel flow F2 back to the inlet of the fuel lift pump unit 22. The bypass flow F4 reduces the initial pressure surge.

In a preferred embodiment, the fuel passageway 44 comprises an external fuel line. Portions of the fuel line may be replaced with internal passageways where the design of the fuel injection pump 16 and the fuel lift pump/fuel filter allows. The outlet 46 of the fuel injection pump 16 may comprise an internal pathway and separate outlet ports 50, 52 for the excess fuel flow F2 and the combustion fuel F1, respectfully. If the fuel injection pump provides a single fuel outlet port, a "T" may be added to the fuel supply line between the fuel injection pump 16 and the engine 18.

The operation of the fuel injection pump 16 and fuel lift pump unit 22 generates heat which is absorbed by the fuel flow. A portion of this heat is carried by the excess fuel flow F2 and may degrade fuel system performance or degrade the quality of the fuel. This is especially true where the engine is operating at a low power demand and the rate of excess fuel flow F2 is high. For example, for a constant capacity flow rate Fmax of 100 gallons per hour, the engine fuel flow F1 may be as low as 20 gallons per hour resulting in an excess fuel flow F2 of eighty gallons per hour.

With reference to the two fuel circuit embodiments 54, 58 (FIGS. 4, 5), the heat generated by the fuel injection pump 16 and the fuel lift pump unit 22 is removed by a heat exchanger to prevent overheating of the fuel. The excess fuel flow F2 may be returned either upstream or downstream of the fuel filter 20. In many applications it is neither necessary nor desirable to refilter the excess fuel flow F2. Alternately, a second filter 21 having a relatively low capacity may be interposed in the return circuit.

Figure 4:
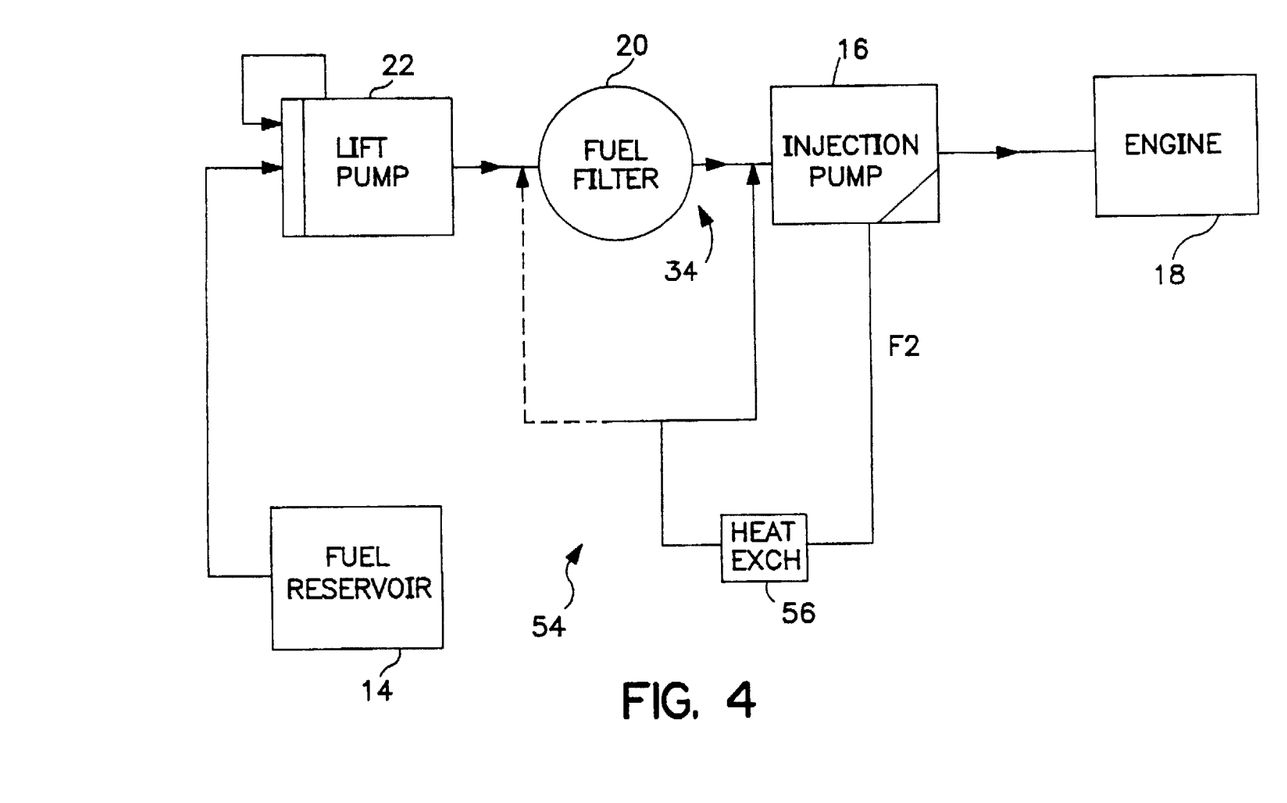
FIG. 4 is a schematic view of a fuel supply system for an internal combustion engine which employs a second embodiment of a fuel circuit in accordance with the invention.

Generally, a fuel-to-air heat exchanger 56, such as a radiator, will remove a sufficient portion of the heat content of the fuel to prevent overheating (FIG. 4).

Figure 5:
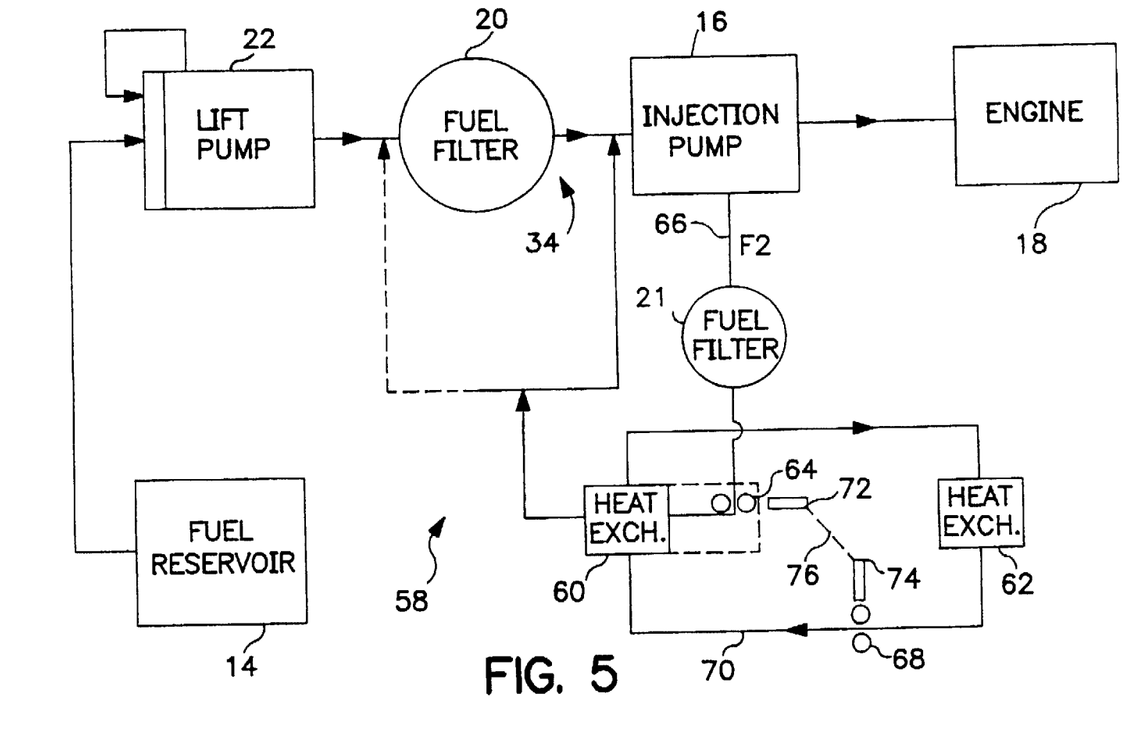
FIG. 5 is a schematic view of a fuel supply system for an internal combustion engine which employs a third embodiment of a fuel circuit in accordance with the invention.

However, for fuel circuit 58 (FIG. 5) which is adapted for applications where the ambient temperature is normally high or the fuel pump and fuel lift pump are expected to add an abnormally high quantity of heat to the fuel, a fuel-to-coolant heat exchanger 60 may be used to remove the heat from the fuel. Such a system employs a second coolant-to-air heat exchanger 62 to remove the heat from the coolant. The coolant may be freon for an air conditioner. A first circulation pump 64 in the fuel line 66 and a second circulation pump 68 in the coolant line 70 may be used to facilitate removal of the heat. A simple paddle-wheel type of pump which may be powered by the fuel flow F2 may be used. As shown in FIG. 5, the controls 72, 74 of the first and second circulation pumps 64, 68 are interconnected 76 such that both of the circulation pumps 64, 68 are turned on and off together.

Figure 6:
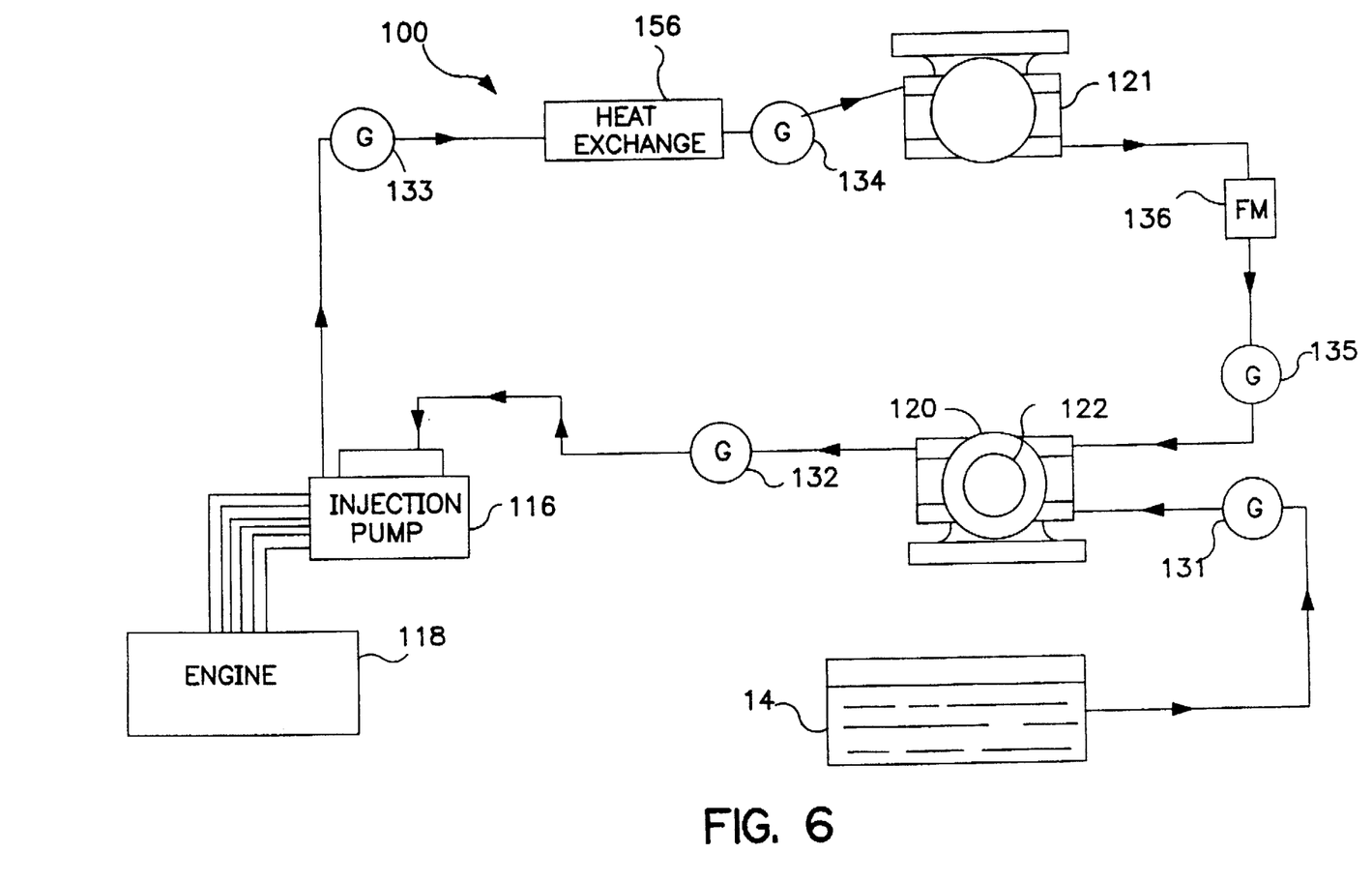
FIG. 6 is a schematic view of a fuel supply system for an internal combustion engine which employs a fourth embodiment of a fuel circuit in accordance with the invention.

With reference to FIG. 6, an example of a fuel circuit 100 in accordance with the invention was constructed for testing purposes. Fuel flowed from a fuel reservoir 14 via a fuel filter 120 to a fuel injection pump 116. An associated lift pump 122 supplied a transfer pressure to the fuel. The fuel injection pump 116 supplied pressurized charges of fuel to an 8.1 liter engine 118 at a fuel consumption rate of 20 gallons per hour. Excess fuel from the injection pump was directed to a heat exchanger 156 and then to a fuel filter 121 which was a Stanadyne Fuel Manager™ 1000 fuel filter. The fuel at the outlet of the filter 121 was supplied to the lift pump 122 (or a bypass path) for return to the fuel injection pump. Temperature and pressure gauges were interposed in the fuel circuit to measure the temperature and pressure at selected circuit locations. Gauge 131 measured the supply pressure and temperature to the lift pump 122. Gauge 132 measured the pump inlet pressure and temperature. Gauge 133 measured the outlet pressure and temperature in the return line from the fuel injection pump and the inlet to the heat exchanger. Gauge 134 measured the outlet pressure and temperature from the heat exchanger. Gauge 135 measured the pressure exiting filter 121 for return to the lift pump. A flow meter 136 was also interposed in the line between the return line filter 121 and the lift pump 122. The temperatures and pressures of the gauges 131–135 were measured at 2200 rpm at a full engine load condition. The measurements are set forth in Table I below.

TABLE I

| Gauge | Pressure (psi) | Temperature °F. | Temperature °C. |
| --- | --- | --- | --- |
| 131 | 1 | 88° F. | 31° C. |
| 132 | 7 | 144° F. | 62° C. |
| 133 | 32 | 167° F. | 75° C. |
| 134 | 9 | 154° F. | 68° C. |
| 135 | 7 | 153° F. | 67° C. |

It will be appreciated that the temperature differential across the fuel injection pump was 23° F. and that the temperature differential across the heat exchanger was 13° F. with a pressure drop of 23 psi. The flow meter showed a fuel flow rate between 85 and 90 gallons per hour in the recirculation circuit.

The described fuel circuits 10, 54, 58, 100 function in an efficient manner to remove heat from the excess fuel produced by a fuel injection system. The excess fuel may be recirculated to the injection system inlet in an efficient manner that does not place an undue load on the filter units and efficiently exploits the output pressure from the injection system to transfer the recirculated excess fuel back to the inlet of the fuel injection system.

While preferred embodiments have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel circulation circuit for a fuel system for supplying fuel to a fuel injection system for an engine, the fuel system having a fuel reservoir, the fuel circulation circuit comprising:

a fuel injection pump comprising inlet means for receiving a flow of fuel and return outlet means for returning a flow of excess fuel;

supply means for defining a supply path from said reservoir to said inlet means of said fuel injection pump;

filter means disposed in said supply path for filtering a flow of fuel; and return passage means for recirculating excess fuel from said return outlet means of said fuel injection pump to an intermediate location of said supply path;

wherein none of the excess fuel is recirculated through said filter means.

2. The fuel circulation circuit of claim 1 wherein said filter means comprises base means and said regulator means is mounted to said base means.

3. The fuel circulation circuit of claim 1 further comprising heat exchanger means disposed in said return passage means for removing heat from said flow of recirculated fuel.

4. The fuel circulation circuit of claim 3 wherein said heat exchanger means comprises a first heat exchanger comprising means defining a first flow path for the flow of recirculated fuel and a second flow path for a flow of coolant, wherein said flow of coolant cools said flow of recirculated fuel.

5. The fuel circulation circuit of claim 1 further comprising regulator means disposed in said supply means for regulating said flow of fuel from the reservoir.

6. The fuel circulation circuit of claim 5 wherein said regulator means is in fluid communication with the fuel reservoir and comprises pump means for pumping a flow of stored fuel from the fuel reservoir to said fuel injection pump.

7. A method for removing heat from fuel in a fuel supply system for an engine, the fuel supply system including a fuel injection pump having an inlet, a fuel reservoir, a fuel supply path intermediate the fuel reservoir and the fuel injection pump, a lift pump for pumping a flow of fuel from the reservoir, a fuel filter disposed in the fuel supply path, and a high pressure portion disposed intermediate the fuel injection pump and the engine, the method comprising the steps of:

pumping a flow of the fuel through the fuel supply path from the fuel reservoir with the lift pump and to the engine via the fuel injection pump;

diverting an excess portion of the flow of fuel from the high pressure portion through a recirculation flow path;

passing the excess portion of the flow of fuel through a first heat exchanger apparatus; and injecting the portion of the excess flow of fuel into the inlet of the fuel injection pump;

wherein none of the excess flow of fuel passes through the lift pump.

8. The method of claim 7 further comprising the step of supplying a flow of cooling liquid to the first heat exchanger apparatus wherein the flow of cooling liquid cools the excess portion of the flow of fuel.

9. The method of claim 8 further comprising the step of cooling the flow of cooling liquid with a second heat exchanger apparatus.

10. A method for recirculating fuel in a fuel supply system for an engine, the fuel supply system including a fuel reservoir, a fuel lift pump, a fuel injection pump having an inlet, a flow regulator, a fuel supply path having a low pressure portion intermediate the fuel reservoir and the fuel injection pump and a high pressure portion in the fuel injection pump and a fuel filter disposed in the low pressure portion of the fuel supply path, the method comprising the steps of:

pumping a flow of the fuel from the fuel reservoir with the lift pump and to the engine with the fuel injection pump through the fuel supply path;

regulating the flow of fuel with the flow regulator;

diverting an excess portion of the flow of fuel from the high pressure portion of the fuel supply path through a recirculation flow path;

removing heat from the excess portion; and injecting the excess portion of the flow of fuel into the inlet of the fuel injection pump;

wherein none of the excess portion of the flow of fuel passes through the fuel filter.

11. The method of claim 10 further comprising the step of regulating the flow of fuel from the reservoir with regulator means disposed in the supply flow path intermediate the fuel reservoir and the fuel filter.

12. The method of claim 10 further comprising circulating a coolant and directing said coolant into heat exchange relationship with said excess fuel.

13. A fuel circulation circuit for a fuel system for supplying fuel to a fuel injection system for an engine, the fuel system having a fuel reservoir, the fuel circulation circuit comprising:

a fuel injection system comprising an inlet, first outlet means for supplying a flow of combustion fuel to the engine and return outlet means for returning a flow of excess fuel;

supply means for defining a supply path from said reservoir to said injection system inlet;

filter means disposed in said supply path for filtering a flow of fuel;

first fuel passage means for providing fuel communication between said first outlet means of said fuel injection system and the engine;

return passage means for recirculating excess fuel from said return outlet means of said fuel injection system to an intermediate location of said supply path; and heat exchanger means disposed in said return passage means for removing heat from said flow of recirculated fuel, said heat exchanger means comprising first and second heat exchangers, said first heat exchanger comprising means defining a first flow path for the flow of recirculated fuel and a second flow path for a flow of coolant, wherein said flow of coolant cools said flow of recirculated fuel, said second heat exchanger comprising means for removing heat from said flow of coolant and coolant path means for providing a coolant flow path between said first and second heat exchangers.

14. The fuel circulation circuit of claim 13 further comprising second pump means for pumping said flow of coolant through said coolant flow path.

15. The fuel circulation circuit of claim 14 further comprising first pump means for pumping said flow of recirculated fuel through said first heat exchanger and comprising first and second control means for controlling said first and second pump means, respectively, and interconnection means for interconnecting said first and second control means wherein one of said first and second control means turns on the other of said first and second control means when said one of said first and second control means is turned on and wherein said one of said first and second control means turns off said other of said first and second control means when said one of said first and second control means is turned off.

16. The fuel circulation path of claim 14 wherein said recirculated fuel flow powers said second pump means.

17. A method for removing heat from fuel in a fuel supply system for an engine, the fuel supply system including a fuel injection system, a fuel reservoir, and a fuel supply path having a low pressure portion intermediate the fuel reservoir and the fuel injection system, a first pump for pumping a flow of fuel from the reservoir, and a second pump for creating a high pressure portion in the fuel injection system, the method comprising the steps of:

pumping a flow of the fuel through the fuel supply path from the fuel reservoir with the first pump and to the engine via the second pump;

diverting an excess portion of the flow of fuel from the high pressure portion of the supply flow path through a recirculation flow path;

passing the excess portion of the flow of fuel through a first heat exchanger apparatus;

injecting the portion of the excess flow of fuel into the low pressure portion of the supply flow path;

supplying a flow of cooling liquid to the first heat exchanger apparatus wherein the flow of cooling liquid cools the excess portion of the flow of fuel; and cooling the flow of cooling liquid with a second heat exchanger apparatus.

18. The fuel circulation circuit of claim 17 wherein said flow of fuel to said inlet means of said fuel injection pump comprises said flow of recirculated excess fuel.

* * * * *